(12) United States Patent
Tamura

(10) Patent No.: US 6,882,518 B2
(45) Date of Patent: Apr. 19, 2005

(54) CAPACITOR DEVICE

(75) Inventor: Hiroyuki Tamura, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/782,602

(22) Filed: Feb. 19, 2004

(65) Prior Publication Data

US 2004/0218343 A1 Nov. 4, 2004

(30) Foreign Application Priority Data

Feb. 20, 2003 (JP) .................................... P. 2003-043320

(51) Int. Cl.[7] .............................................. H01G 9/04
(52) U.S. Cl. ....................... 361/510; 361/516; 361/528; 361/532
(58) Field of Search .......................... 361/510, 508–509, 361/516, 532, 528, 529, 533, 540

(56) References Cited

U.S. PATENT DOCUMENTS

| 5,781,401 A | * | 7/1998 | Tomiyasu et al. | ........... 361/303 |
| 6,519,135 B1 | * | 2/2003 | Sano et al. | ................. 361/510 |
| 6,665,172 B1 | * | 12/2003 | Kim et al. | ................... 361/523 |

* cited by examiner

*Primary Examiner*—Anthony Dinkins
(74) *Attorney, Agent, or Firm*—Fish & Richardson P.C.

(57) ABSTRACT

To provide a capacitor device that can be made lighter in weight, thin shaped, and miniaturized, which has a plurality of conductive pattern electrodes 18 and 22 electrically separated by a separation groove 19; a capacitor element 15 including an anode lead 16 fixed to the one conductive pattern electrode 18 and a cathode lead 17 fixed to the other conductive pattern electrode 22; an insulating resin 24 for covering the capacitor element 15 and a part working as the conductive pattern electrodes 18 and 22 except for a lower face of the conductive pattern electrodes 18 and 22, and for integrally supporting the conductive pattern electrode and the capacitor element.

9 Claims, 6 Drawing Sheets

CAPACITOR DEVICE

BACKGROUND OF THE INVENTION

1. Field of the Invention

The present invention relates to a tantalum chip type capacitor device used for a portable device or the like (e.g., telephone).

2. Related Art

A tantalum chip type capacitor device has been used for a power source circuit for a portable device (e.g., telephone, laptop computer) requiring a large capacity. In the future, an increasingly miniaturized, thin-shaped and lighter weight tantalum chip type capacitor device will be demanded.

FIG. 8 is a cross-sectional view illustrating a capacitor element used for the tantalum chip type capacitor device.

As shown in FIG. 8, the capacitor element 1 is made in such a manner that tantalum (Ta) 2 in the form of metal powders and a tantalum bar 3 that works as an anode terminal are subjected to pressurization, molding and vacuum hardening, and in the surface thereof, a tantalum oxide film ($Ta_2O_5$) 4 used as a dielectric body is formed by electrochemical anodization.

As an electrolyte, a solid manganese dioxide layer ($MnO_2$) 5 is formed thereon by the thermal decomposition of manganese nitrate. In order to allow this manganese dioxide layer 5 to have thereon an electric connection, a graphite layer 6 is provided. On the graphite layer 6, a cathode lead 8 is formed by use of a silver covering material 7 and a conductive adhesive agent.

FIG. 9 is a schematic view of a conventional tantalum chip type capacitor device using the capacitor element 1. The anode terminal 9 which is bent in the shape of an overturned letter U is welded to the tantalum bar 3 of the capacitor element 1 provided as described above at a welding point 10. The cathode terminal 11 bent in a complicated manner is pressure-bonded to the cathode lead 8 formed of a conductive adhesive agent. Furthermore, the capacitor element 1, the anode terminal 9, and the cathode terminal 11 are partially exposed to the exterior to be molded by an epoxy resin 12, thereby forming the chip tantalum capacitor.

As described above, bent and intricately-shaped electrode elements have been used for an anode terminal and a cathode terminal of conventional tantalum chip type capacitor devices, thus requiring man-hours and cost. Additionally, bent and intricately-shaped electrode elements have been used, therefore, miniaturized, lighter weight and thin-shaped chip capacitors were not achieved.

SUMMARY OF THE INVENTION

The preferred embodiment of the present invention provides a miniaturized, lighter weight and thin-shaped chip type capacitor device.

The preferred embodiment of the present invention provides a capacitor device comprising of: a plurality of conductive pattern electrodes electrically separated by a separation groove; a capacitor element comprising an anode lead fixed to a first conductive pattern electrode and a cathode lead fixed to a second conductive pattern electrode; and an insulating resin for covering the capacitor element and a part except for a lower face of the first and second conductive pattern electrodes and for integrally supporting the first and second conductive pattern electrodes and the capacitor element.

The preferred embodiment of the present invention provides a capacitor device comprising of: a plurality of conductive pattern electrodes electrically separated by a separation groove; a capacitor element comprising an anode lead fixed to a first conductive pattern electrode and a cathode lead fixed to a second conductive pattern electrode; a circuit element bare chip attached to the pad on a third conductive pattern electrode; and an insulating resin for covering the capacitor element, the bare chip, and a part except for the lower faces of the first second and third conductive pattern electrodes and for integrally supporting the first second and third conductive pattern electrode, the capacitor element, and the bare chip.

Although the capacitor device of the present invention is electrically separated by the separation groove, the first conductive pattern electrode in which the lower part is connected via the conductive pattern is fixed with the capacitor element anode lead; the cathode lead is fixed to the second conductive pattern electrode; the insulating resin is used to cover these capacitor element and conductive pattern electrodes and integrally support the conductive pattern electrodes and the capacitor element. Thereafter, the connected section of the conductive pattern is removed and the back face of the conductive pattern electrodes is exposed to the exterior.

Accordingly, a complicated metal fitting used for an anode lead and a cathode lead as an electrode as in the conventional chip capacitor becomes unnecessary, realizing a miniaturized, lighter weight and thin-shaped capacitor device.

Further, the capacitor element as well as another circuit element chip forming a hybrid integrated circuit are simultaneously attached to the conductive pattern and are covered and fixed with the insulating resin, thereby forming a hybrid integrated circuit including the capacitor element.

DESCRIPTION OF THE DRAWINGS

FIG. 1 shows a capacitor device of the preferred embodiment.

FIG. 6 is a capacitor device showing still another embodiment of the capacitor device of the preferred embodiment.

DESCRIPTION OF THE PREFERRED EMBODIMENTS

The capacitor device of the present invention will be described with reference to FIG. 1 to FIG. 7.

Figure 1A:
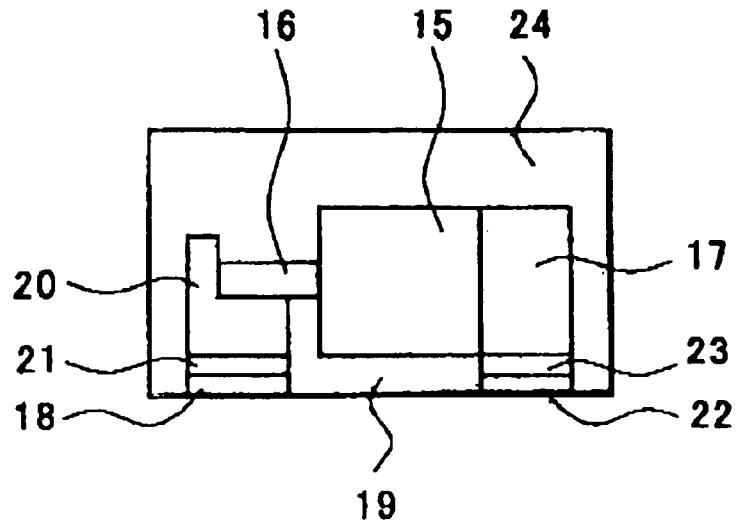
FIG. 1A is a side view.
Figure 1B:
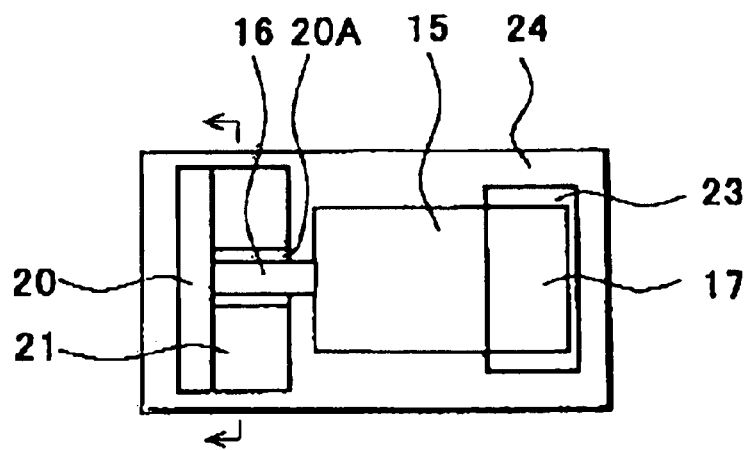
FIG. 1B is a plain view.
Figure 1C:
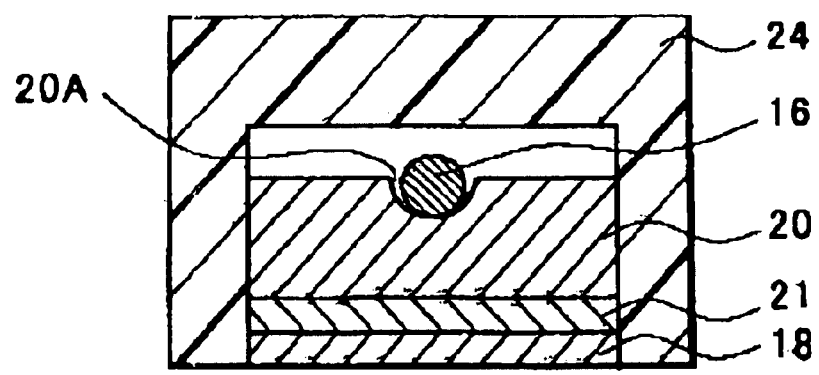
FIG. 1C is a cross-sectional view.

FIG. 1 shows a side view of the capacitor device of the present invention, FIG. 1A is a side view; FIG. 1B is a plain view; and FIG. 1C is a cross-sectional view. The capacitor element 15 has an anode lead 16 that is provided, as described above, by subjecting the tantalum Ta in the form of metal powders and the tantalum bar to pressurization, molding, and vacuum hardening. The capacitor element 15 has also a cathode lead 17 that is provided with a graphite layer and a conductive adhesive agent on the manganese dioxide layer which is made into a dielectric body consisting of a tantalum oxide film.

The anode lead 16 and the cathode lead 17 of the capacitor element 15 are constructed by a special hybrid integrated circuit technique (which will be described later) and are attached to first and second conductive pattern electrodes 18 and 22 separated by a separation groove 19. The anode lead 16 of the capacitor element 15 cannot be directly fixed to the first conductive pattern electrode 18 since the anode lead 16 is separated therefrom as is. Thus, by using the metal fitting 20 bent in an "L" shape, the concave section 20A provided at the upper part of the metal fitting 20 is engaged with the plated tip end of the anode lead 16 for positioning. Next, the lower back face of the metal fitting 20 is soldered and fixed to the first conductive pattern electrode 18 with a solder 21 and the anode lead 16 is fixed to the first conductive pattern electrode 18.

Instead of soldering the lower back face of the metal fitting 20 to the first conductive pattern electrode 18, Ag paste or an electrically conductive adhesive agent also may be used for fixture. Although the cathode lead 17 of the capacitor element 15 is directly soldered and fixed to the second conductive pattern electrode 22 with a solder 23, Ag paste or an electrically conductive adhesive agent also may be used for fixture instead of soldering as described above.

The capacitor element 15, the anode lead 16, the cathode lead 17, the metal fitting 20, and the first and second conductive pattern electrodes 18 and 22 except for the lower faces are covered with the insulating resin 24 and are integrally supported by the insulating resin 24, thereby forming the chip type capacitor device. Thus, the lower faces of the first and second conductive pattern 18 and 22 are exposed, allowing the chip type capacitor device to be directly attached to a printed wiring of a printed circuit board.

Figure 2A:
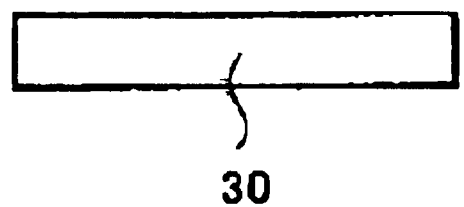
FIG. 2 is a side view illustrating a manufacturing process of the capacitor device of the preferred embodiment.

FIG. 2 and FIG. 3 are side views, respectively, for explaining the process for assembling the capacitor device of FIG. 1 using a special hybrid integrated circuit technique. First, as shown in FIG. 2A, a conductive foil 30 is prepared. A conductive foil which is mainly composed of Cu but also may be composed of Al or may consist of an alloy such as Fe—Ni is employed.

Figure 2B:
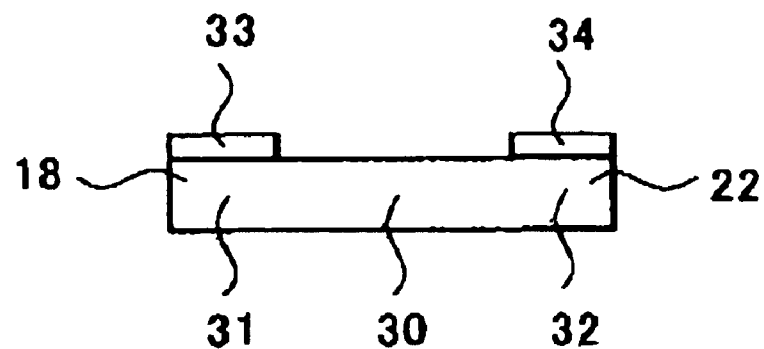
Figure 2C:
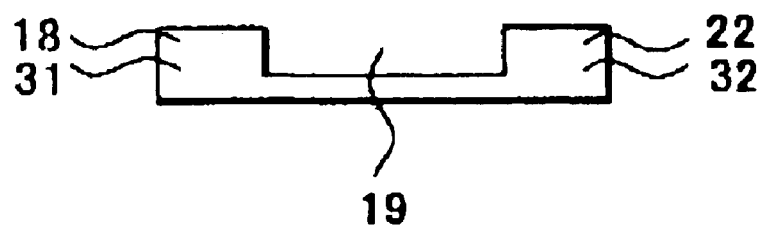

Next, as shown in FIG. 2B, photoresists 33 and 34 are patterned such that the conductive foil 30 is exposed except for a region working as the conductive patterns 31 and 32 constituting the first and second conductive pattern electrodes 18 and 22 of the conductive foil 30. Then, as shown in FIG. 2C, the conductive foil 30 is selectively etched to provide a plurality of conductive patterns 31 and 32 separated by the separation groove 19. In this status, a part working as the first and second conductive pattern electrodes 18 and 22 of the conductive patterns 31 and 32 is separated by the separation groove 19 but the lower part is connected.

Figure 3A:
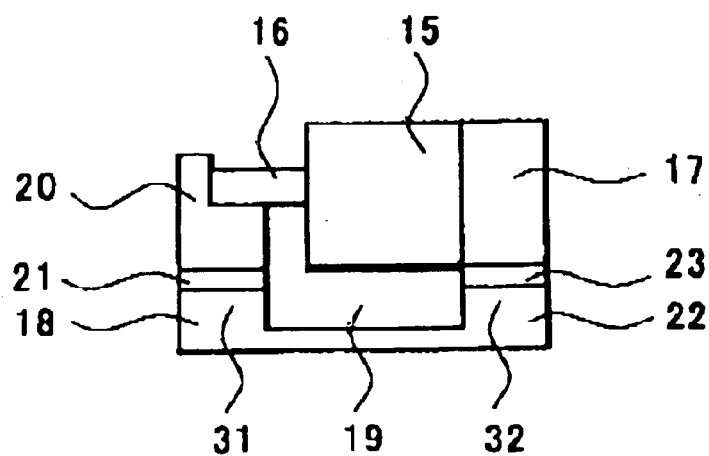
FIG. 3 is a side view illustrating a manufacturing process of the capacitor device of the preferred embodiment.

Thereafter, as shown in FIG. 3A, the anode lead 16 of the capacitor element 15 is welded to the L-shaped metal fitting 20 and the lower faces of the metal fitting 20 is soldered and fixed to the conductive pattern electrode 31 with the soldering 21. Then, the cathode lead 17 of the capacitor element 15 is soldered to the conductive pattern 32 with the soldering 23. In this case, the conductive patterns 31 and 32 are still connected, thus facilitating the operation.

Figure 3B:
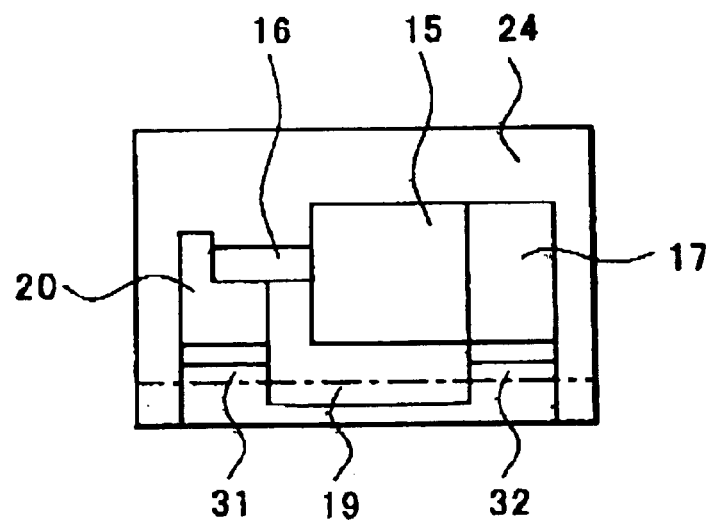
Figure 3C:
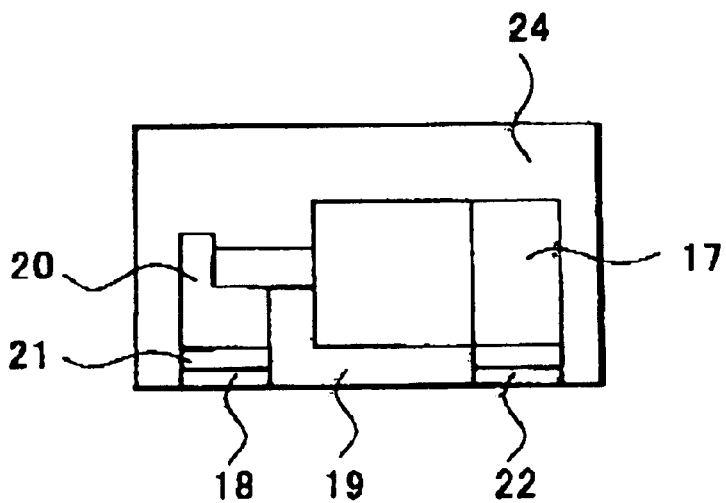

Thereafter, as shown in FIG. 3B, the capacitor element 15, the metal fitting 20, and the conductive patterns 31 and 32 are entirely covered with the insulating resin 24 for supporting and fixing. Finally, the insulating resin 24 is separated from the conductive patterns 31 and 32 at a broken line shown in FIG. 3B. This allows as shown in FIG. 3C the conductive patterns 31 and 32 to be perfectly separated from each other and the lower face of the separated part becomes the externally exposed the first and second conductive pattern electrodes 18 and 22, thereby forming the capacitor device shown in FIG. 1.

In FIG. 2 and FIG. 3, only the capacitor device assembled by a special hybrid integrated circuit technique is shown, however, FIG. 4 is a side view illustrating the process for assembling a hybrid integrated circuit with other circuit elements.

Figure 4A:
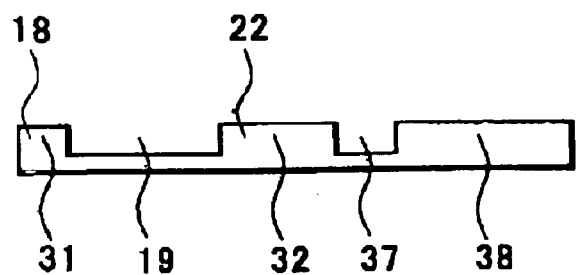
FIG. 4 is a side view illustrating still another manufacturing process of the capacitor device of the preferred embodiment.

In FIG. 4A, parts working as the first and second conductive pattern electrodes 18 and 22 which are separated at the separation groove 19 form the conductive patterns 31 and 32, respectively, and a part which is separated by the separation groove 37 forms a third conductive pattern 38.

Figure 4B:
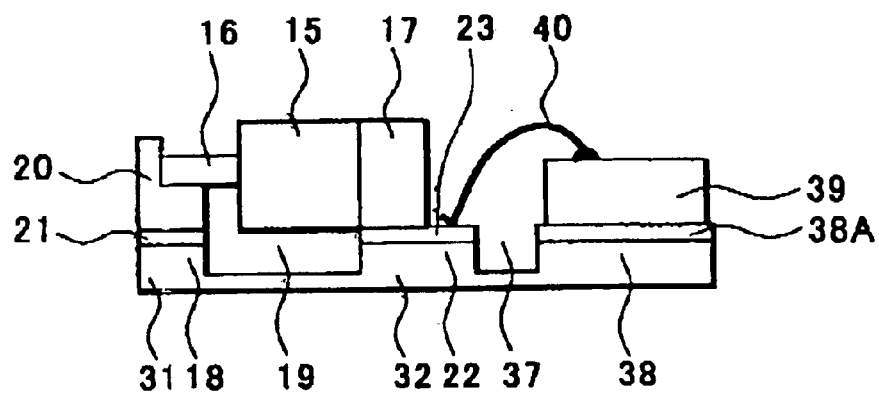

Next, as shown in FIG. 4B, the anode lead 16 of the capacitor element 15 is welded to the L-shaped metal fitting 20 and the lower back face of the metal fitting 20 is fixed to the conductive pattern electrode 31 by the soldering 21. The cathode lead 17 of the capacitor element 15 is also soldered to the conductive pattern 32 with the solder 23.

Then, a pad 38A formed on the conductive pattern 38 is attached with a bare chip 39 which is a power transistor as a circuit element, for example. Then, the electrode of the bare chip 39 is bonded and connected to the conductive pattern 32 via a thin metal wiring 40.

Figure 4C:
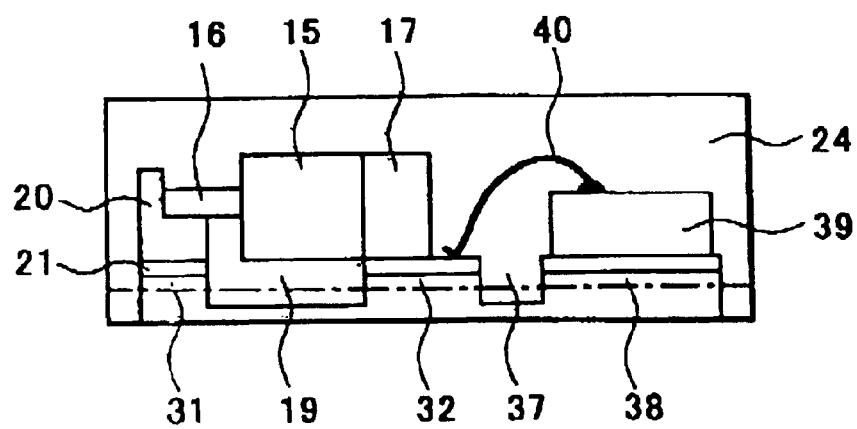

Next, as shown in FIG. 4C, the capacitor element 15, the metal fitting 20, the conductive patterns 31, 32, and 38, the bare chip 39, and the thin metal wiring 40 are entirely covered with the insulating resin 24 and these are supported and fixed.

Figure 4D:
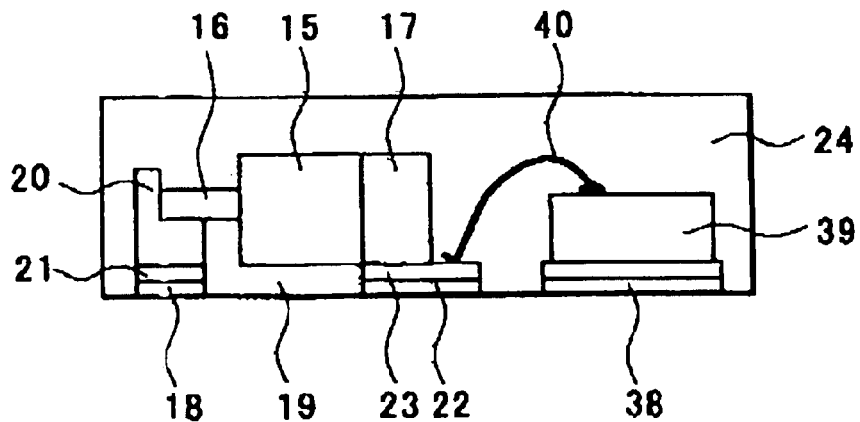

Thereafter, the insulating resin 24 is separated from the conductive patterns 31, 32, and 38 at a broken line shown in FIG. 4C. This allows as shown in FIG. 4D the conductive patterns 31, 32, and 38 to be perfectly separated from one another and the lower face of the separated part becomes the externally exposed the first, second and third conductive pattern electrodes 18, 22, and 38, thereby forming the hybrid integrated circuit including the capacitor element.

Although the power transistor bare chip as an example of the circuit element is given as described above, the circuit element also may be an LSI bare chip and the number of the circuit elements is not limited to one and a plurality of required circuit elements also may be assembled at the same time.

Figure 5:
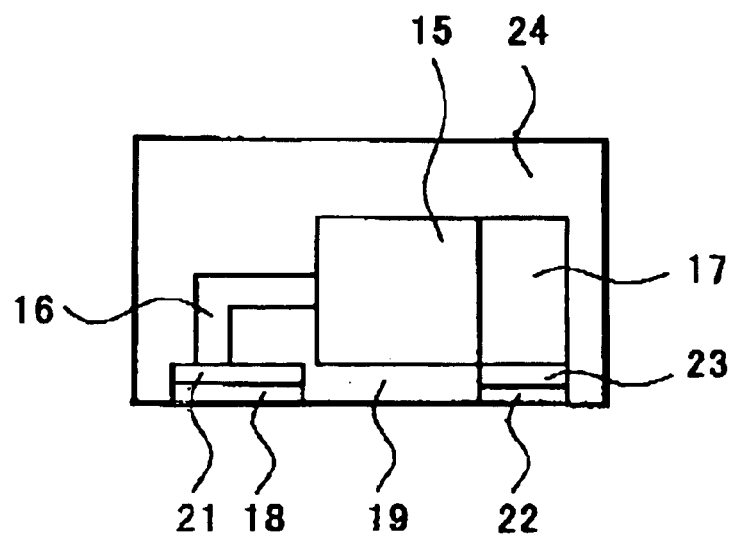
FIG. 5 is a side view illustrating another embodiment of the capacitor device of the preferred embodiment.

FIG. 5 is a side view illustrating another embodiment of the capacitor device of the present invention. In FIG. 1, the anode lead 16 of the capacitor element 15 is separated from the first conductive pattern 18 and cannot be fixed thereto, therefore, the metal fitting 20 is used. However, the structure shown in FIG. 5 allows the anode lead 16 of the capacitor element 15 to be bent downward. The bent plated tip end of the anode lead 16 is soldered to the first conductive pattern 18 with the solder 21. This allows, without using the metal fitting 20, the anode lead 16 to be fixed to the first conductive pattern electrode 18.

The cathode lead 17 of the capacitor element 15 is directly soldered and fixed to the second conductive pattern electrode 22 with the soldering 23 as described above. Thereafter, the capacitor element 15, the anode lead 16, the cathode lead 17, the metal fitting 20, and the first and second conductive patterns 18 and 22 except for the lower face are covered by the insulating resin 24 and are integrally supported, thereby forming the chip type capacitor device.

Figure 6A:
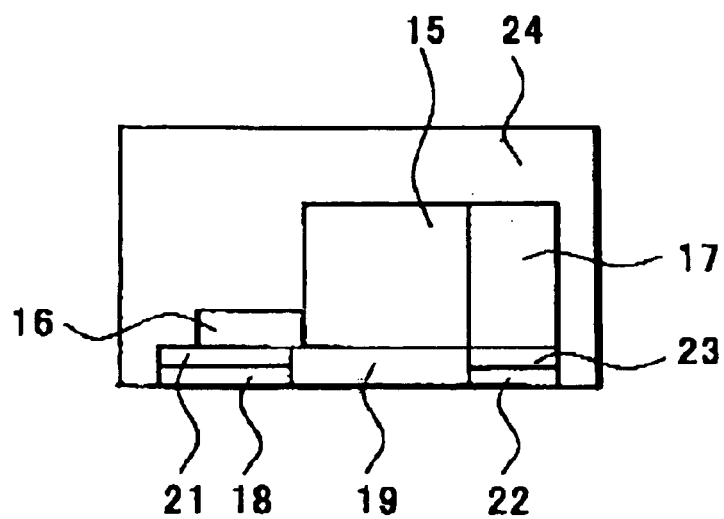
FIG. 6A is a side view and FIG. 6B is a cross-sectional view.
Figure 6B:
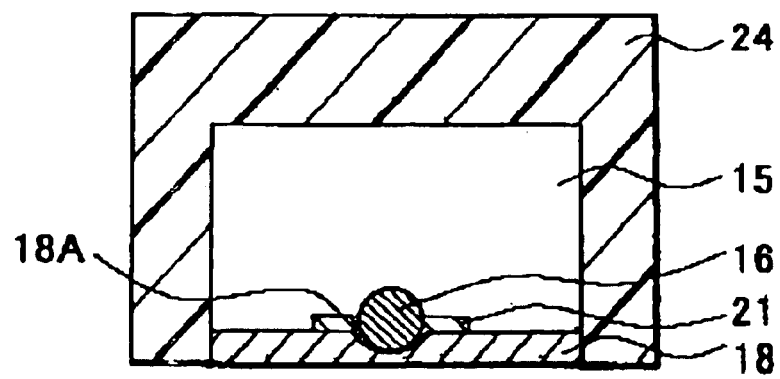

FIG. 6 similarly shows still another embodiment of the capacitor device of the present invention, FIG. 6A is a side view and FIG. 6B is a cross-sectional view. The capacitor device is similarly that in which the anode lead 16 of the capacitor element 15 can be directly fixed to the first conductive pattern 18 without using the metal fitting 20. Then, the anode lead 16 is slid so as to extrude from the lower part of the dielectric body. Then, the anode lead 16 is directly engaged with a concave section 18A provided in the first conductive pattern 18 for positioning and is soldered and fixed with the soldering 21.

Figure 7:
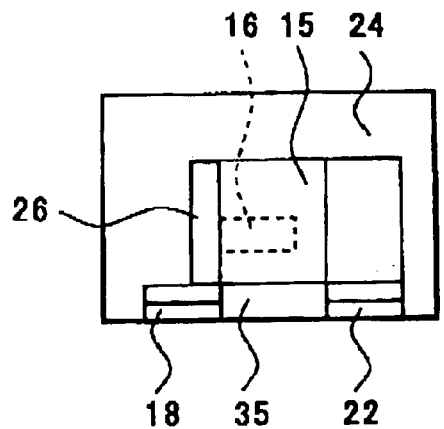
FIG. 7 is a side view showing further another embodiment of the capacitor device of the preferred embodiment.
Figure 8:
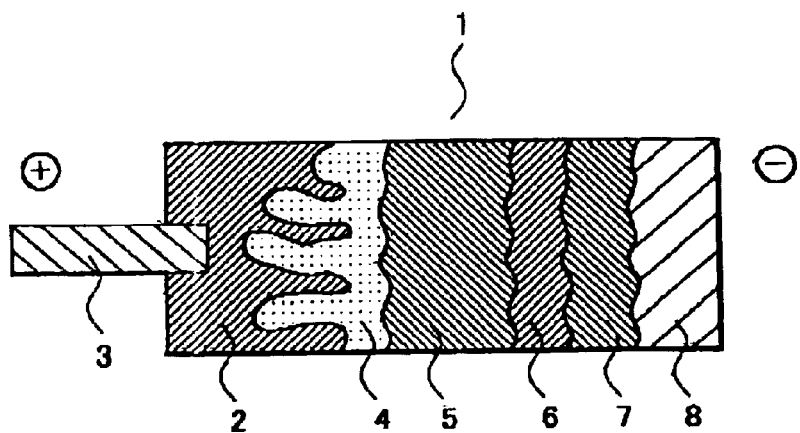
FIG. 8 is a cross-sectional view illustrating the capacitor elements used for the capacitor devices of the preferred embodiment and the conventional art.
Figure 9:
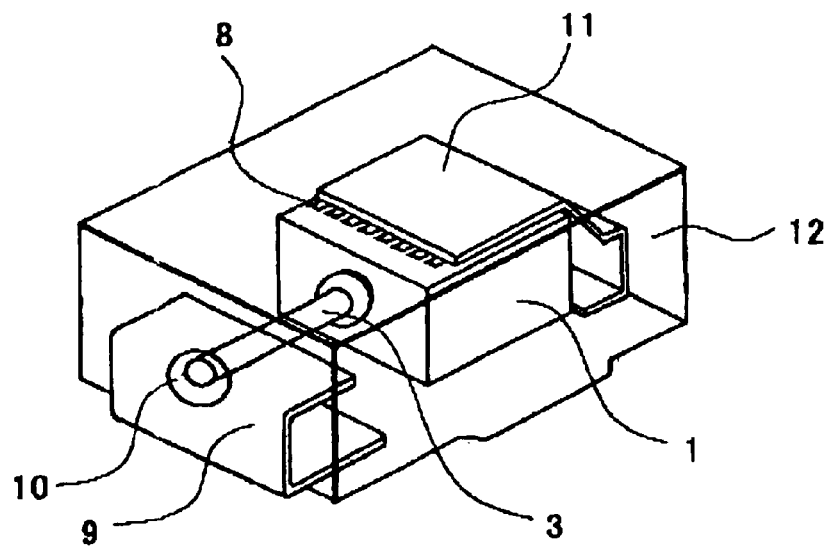
FIG. 9 is a schematic view illustrating the conventional chip tantalum capacitor.

FIG. 7 is a side view similarly showing still another embodiment of the capacitor device of the present invention. As shown in FIG. 5 and FIG. 6, the capacitor device is that in which the anode lead 16 of the capacitor element 15 can be fixed to the first conductive pattern 18 without using the metal fitting 20.

The majority of marketed capacitor elements have a structure in which the anode lead 16 protrudes from the center. However, in FIG. 5, the anode lead 16 of the capacitor element 15 is subjected to a special processing, while in FIG. 6, a position which derives the anode lead 16 from the capacitor element 15 is changed. This causes a problem in which a generally-used capacitor element cannot be used.

To prevent this, FIG. 7 shows a structure in which a generally-marketed capacitor element 15 is used to attach the anode lead 16 to the conductive terminal 18 without using the metal fitting 20. Specifically, a face from which the anode lead 16 of the capacitor element 15 extrudes is made into flat by plating. The flat plated layer 26 is fixed to the first conductive pattern 18 with conductive adhesive agent or the like. Otherwise, details of the structure are the same as the above.

As shown in FIG. 4, the methods of FIG. 5 to FIG. 7 also can be applied to a case where the capacitor device as well as other circuit element bare chips are simultaneously covered and supported with an insulating resin.

What is claimed is:

1. A capacitor device comprising;
  a plurality of conductive pattern electrodes electrically separated by a separation groove;
  a capacitor element comprising an anode lead fixed to a first conductive pattern electrode and a cathode lead fixed to a second conductive pattern electrode; and
  an insulating resin for covering the capacitor element and a part except for a lower face of the first and second conductive pattern electrodes and for integrally supporting the first and second conductive pattern electrodes and the capacitor element.

2. The capacitor device according to claim 1, wherein the anode lead is connected to an upper part of an "L"-shaped metal fitting, a lower back face of a metal fitting is adhered to the first conductive pattern electrode, and the anode lead is fixed to the first conductive pattern electrode.

3. The capacitor device according to claim 2, wherein a concave section is provided at an upper face of the metal fitting, which is engaged with the anode lead of the capacitor for positioning.

4. The capacitor device according to claim 1, wherein the anode lead is bent and fixed to the first conductive pattern electrode and the cathode lead is directly fixed to the second conductive pattern electrode.

5. The capacitor device according to claim 1, wherein the anode lead is derived at a dislocated position and is directly fixed to the first conductive pattern electrode and the cathode lead is directly fixed to the second conductive pattern electrode.

6. The capacitor device according to claim 5, wherein a concave section is provided on the first conductive pattern, which is engaged with the anode lead for positioning.

7. The capacitor device according to claim 1, wherein the anode lead is subjected to plating to form a flat section, the flat section is fixed to the second conductive pattern electrode, and the cathode lead is directly fixed to the second conductive pattern electrode.

8. A capacitor device comprising;
  a plurality of conductive pattern electrodes electrically separated by a separation groove;
  a capacitor element comprising an anode lead fixed to a first conductive pattern electrode and a cathode lead fixed to a second conductive pattern electrode;
  a circuit element bare chip attached to the pad on a third conductive pattern electrode; and
  an insulating resin for covering the capacitor element, the bare chip, and a part except for the lower faces of the first, second and third conductive pattern electrodes and for integrally supporting the first, second and third conductive pattern electrode, the capacitor element, and the bare chip.

9. The capacitor device according to claim 1 or 6, wherein the capacitor element is made in such a manner that tantalum in the form of metal powders and the anode lead are subjected to pressurization and molding, and a dielectric body is made by a tantalum oxide film.

* * * * *